United States Patent
Nyisztor et al.

(10) Patent No.: US 9,158,522 B2
(45) Date of Patent: Oct. 13, 2015

(54) BEHAVIORAL EXTENSIBILITY FOR MOBILE APPLICATIONS

(71) Applicants: Karoly Nyisztor, Dunakeszi (HU); Krisztian Balazs Szaniszlo, Budapest (HU); Zoltan Farkas, Hernadnemeti (HU); Zsolt Valyi Nagy, Budapest (HU)

(72) Inventors: Karoly Nyisztor, Dunakeszi (HU); Krisztian Balazs Szaniszlo, Budapest (HU); Zoltan Farkas, Hernadnemeti (HU); Zsolt Valyi Nagy, Budapest (HU)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/448,851

(22) Filed: Jul. 31, 2014

(65) Prior Publication Data

US 2015/0067641 A1 Mar. 5, 2015

Related U.S. Application Data

(60) Provisional application No. 61/860,703, filed on Jul. 31, 2013, provisional application No. 61/860,716, filed on Jul. 31, 2013.

(51) Int. Cl.
| | |
|---|---|
| *G06F 9/44* | (2006.01) |
| *G06F 9/445* | (2006.01) |
| *H04L 12/24* | (2006.01) |
| *H04L 29/06* | (2006.01) |
| *H04L 29/08* | (2006.01) |
| *H04W 4/00* | (2009.01) |

(52) U.S. Cl.
CPC .. *G06F 8/60* (2013.01); *G06F 8/65* (2013.01); *G06F 8/71* (2013.01); *G06F 9/44505* (2013.01); *H04L 41/082* (2013.01); *H04L 63/08* (2013.01); *H04L 67/34* (2013.01); *H04W 4/003* (2013.01); *G06F 8/36* (2013.01)

(58) Field of Classification Search
None
See application file for complete search history.

(56) References Cited

U.S. PATENT DOCUMENTS

| | | | |
|---|---|---|---|
| 7,096,464 B1 | 8/2006 | Weinmann | |
| 7,171,661 B1* | 1/2007 | Pinera et al. | 717/172 |
| 7,290,257 B2 | 10/2007 | Henig et al. | |
| 7,296,255 B2* | 11/2007 | Garms et al. | 717/100 |
| 7,836,441 B2* | 11/2010 | Chen et al. | 717/168 |
| 8,225,303 B2 | 7/2012 | Wagner et al. | |
| 8,370,298 B2 | 2/2013 | Strong et al. | |
| 8,434,097 B2 | 4/2013 | Brandow et al. | |
| 8,543,972 B2 | 9/2013 | Chen et al. | |
| 8,635,522 B2 | 1/2014 | Lee et al. | |
| 8,769,553 B2* | 7/2014 | Nigam | 719/329 |
| 8,774,029 B1 | 7/2014 | Mudalegundi et al. | |
| 8,813,028 B2 | 8/2014 | Farooqi | |
| 8,832,181 B2* | 9/2014 | Merissert-Coffinieres et al. | 709/203 |
| 8,949,406 B2* | 2/2015 | Wenig et al. | 709/224 |

(Continued)

OTHER PUBLICATIONS

"U.S. Appl. No. 14/062,160, Non Final Office Action mailed May 6, 2015", 23 pgs.

*Primary Examiner* — Don Wong
*Assistant Examiner* — Hossain Morshed
(74) *Attorney, Agent, or Firm* — Schwegman Lundberg & Woessner, P.A.

(57) ABSTRACT

In example embodiments, systems, methods, devices, and machine-readable media for creating and/or executing extensible mobile applications are provided. Extensibility of a mobile application deployed on a device is achieved with configuration files that can be provided to the device at a time after initial deployment of the application. Mobile application framework components combined with the code of the application enable extracting Java scripts from the configuration files, and executing the Java scripts to thereby alter the behavior of the application.

17 Claims, 10 Drawing Sheets

(56) References Cited

U.S. PATENT DOCUMENTS

| | | | |
|---|---|---|---|
| 8,978,021 B2* | 3/2015 | DeAnna et al. | 717/140 |
| 2003/0004952 A1 | 1/2003 | Nixon et al. | |
| 2003/0005019 A1 | 1/2003 | Pabla et al. | |
| 2004/0046789 A1* | 3/2004 | Inanoria | 345/748 |
| 2007/0152058 A1 | 7/2007 | Yeakley et al. | |
| 2009/0013336 A1* | 1/2009 | Backhouse et al. | 719/328 |
| 2010/0017812 A1 | 1/2010 | Nigam | |
| 2010/0274813 A1 | 10/2010 | Lu et al. | |
| 2010/0281475 A1 | 11/2010 | Jain et al. | |
| 2011/0154287 A1* | 6/2011 | Mukkamala et al. | 717/105 |
| 2012/0036552 A1* | 2/2012 | Dare et al. | 726/1 |
| 2012/0079361 A1* | 3/2012 | Itoko et al. | 715/205 |
| 2012/0180073 A1 | 7/2012 | Hung | |
| 2012/0204114 A1 | 8/2012 | Jessen et al. | |
| 2012/0226970 A1* | 9/2012 | Porter et al. | 715/234 |
| 2013/0067489 A1* | 3/2013 | Fields et al. | 719/314 |
| 2013/0091197 A1* | 4/2013 | Bar-Zeev et al. | 709/203 |
| 2013/0151996 A1 | 6/2013 | Nario et al. | |
| 2013/0166303 A1 | 6/2013 | Chang et al. | |
| 2013/0262626 A1 | 10/2013 | Bozek et al. | |
| 2013/0318125 A1 | 11/2013 | Smith et al. | |
| 2014/0067835 A1 | 3/2014 | Harrison et al. | |
| 2014/0068588 A1 | 3/2014 | Tan et al. | |
| 2014/0068589 A1 | 3/2014 | Barak | |
| 2014/0082588 A1* | 3/2014 | Perkins | 717/115 |
| 2014/0109046 A1 | 4/2014 | Hirsch et al. | |
| 2014/0122996 A1* | 5/2014 | Gupta et al. | 715/234 |
| 2014/0172783 A1* | 6/2014 | Suzuki et al. | 707/609 |
| 2014/0189681 A1 | 7/2014 | Bryan et al. | |
| 2014/0223452 A1* | 8/2014 | Santhanam et al. | 719/328 |
| 2014/0244623 A1* | 8/2014 | King | 707/722 |
| 2014/0282567 A1* | 9/2014 | Bhakar et al. | 718/102 |
| 2014/0372533 A1 | 12/2014 | Fu et al. | |
| 2015/0039732 A1 | 2/2015 | Mall et al. | |
| 2015/0067641 A1* | 3/2015 | Nyisztor et al. | 717/121 |
| 2015/0100879 A1* | 4/2015 | Nandagopal et al. | 715/235 |
| 2015/0128154 A1* | 5/2015 | Teibel et al. | 719/320 |

* cited by examiner

| JS type | Android type | iOS type | Remarks |
|---|---|---|---|
| String | String | NSString | |
| Date | java.util.Date | NSDate | |
| Number | java.lang.Long, java.lang.Double, java.math.BigDecimal | NSNumber, NSDecimalNumber | Depending on the precision of the Javascript number itself. |
| DecimalNumber | java.math.BigDecimal | NSDecimalNumber | |
| boolean | java.lang.Boolean | NSNumber | |
| | | | |

FIG. 3B

BEHAVIORAL EXTENSIBILITY FOR MOBILE APPLICATIONS

CROSS-RELATION TO RELATED APPLICATIONS

This application claims priority to U.S. Provisional Application No. 61/860,703, filed Jul. 31, 2013, and to U.S. Provisional Application No. 61/860,716, filed Jul. 31, 2013, both of which are incorporated herein by reference in their entireties.

TECHNICAL FIELD

This document relates generally to mobile application frameworks, and more particularly to extensible applications, e.g., as created with a mobile application framework.

BACKGROUND

Mobile applications (also known as "apps") have dramatically increased in popularity with the rise of smartphones and tablets. It is common for these applications to be downloaded by end users from a central repository, sometimes referred to as an "app store." Application developers typically design the application, test the code, compile the code, and then upload the compiled code representing the application to the app store. Updates to the application, even for minor changes such as user interface changes (e.g., logo changes, font changes, color changes, etc.), have in the past typically required that the application be recompiled and the updated version be uploaded to the app store and thereafter downloaded by the user to the mobile device. A more convenient way of updating mobile applications is desirable.

BRIEF DESCRIPTION OF DRAWINGS

The present disclosure illustrates embodiments of the invention by way of example and not limitation, and with reference to the following drawings:

FIG. 3B is a table showing the mapping between Javascript-specific data types and native data types in accordance with various embodiments.

DETAILED DESCRIPTION

Figure 1:
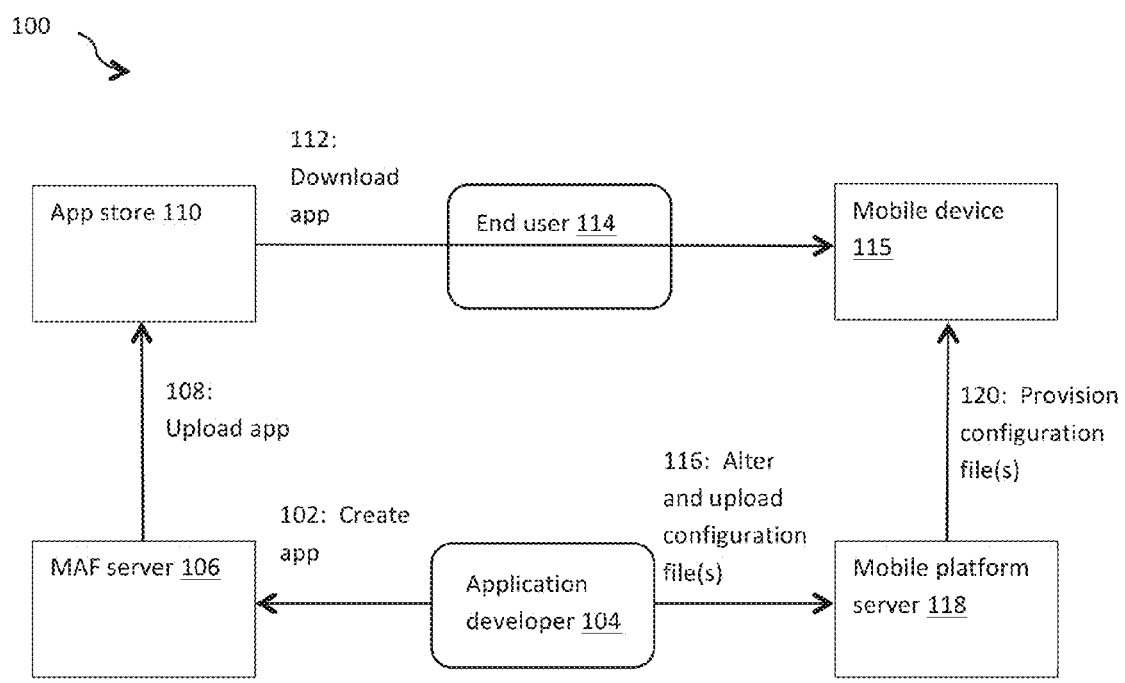
FIG. 1 is a functional block diagram illustrating a system and method for distributing and updating a mobile application in accordance with various embodiments.

The description that follows includes systems, methods, techniques, instruction sequences, and computing machine program products that embody illustrative embodiments of the disclosure. For the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In general, this disclosure relates to creating and modifying extensible mobile applications. In various embodiments, extensibility is achieved with extensibility components of a mobile application framework (MAF) that are integrated into an application prior to its deployment on a mobile device, in conjunction with configuration files that dynamically reconfigure the mobile application and can be loaded onto the device at a later time, after deployment of the original application. Various embodiments provide both structural extensibility, i.e., the ability to modify the user interface, navigation flow, and data bindings, as well as behavioral extensibility, i.e., the ability to extend and/or modify the control logic of the application. Behavioral extensibility may be achieved by equipping the MAF extensibility components with Javascript execution capabilities, and incorporating Java scripts that alter the behavior of the application into the configuration files. This allows application developers to change and extend mobile applications, without the need for recompiling and redistributing the original application, by simply distributing the new configuration files (e.g., by placing them into a configuration repository on a central server for retrieval therefrom by the mobile devices).

In some embodiments, an MAF provides a powerful and flexible platform for application developers to build, deploy, and modify mobile applications. The MAF may include one or more libraries of generic, re-usable MAF components (including, but not limited to, extensibility-related components) that the developer can bundle with custom application code. These components may include, for instance, application programming interfaces (APIs) that provide access to native functionality of mobile devices, such as a device's built-in camera, accelerometer, contact lists, push notifications, etc. The MAF may also provide the developer with a choice of customizable application templates, e.g., for enterprise-ready mobile applications; use of such templates may serve to increase developer productivity as well as to create a standardized look and feel across applications. The developer generally has multiple options for building the application: he can choose to define the application fully with metadata, partially with metadata and partially with custom code, or fully with custom code and using configuration files only for extension purposes. The custom code can generally be written in any suitable programming language, including, without limitation, C, C++, Objective C, PHP, Perl, Python, Basic, Java, Javascript, Ruby, etc.; in various embodiments, an object-oriented language such as Objective-C is used. In embodiments, the custom code includes one or more calls to one or more of the MAF components.

FIG. 1 provides an overview of a method 100, in accordance with various embodiments, of generating and modifying a mobile application, and of system components and human actors associated therewith. At operation 102, an application developer 104 may create an extensible application using an MAF provided by an MAF provider on an MAF server 106. The application may include custom code, one or more of the generic MAF components, and/or customized configuration files, which may be compiled and bundled together in a single deployable unit. At operation 108, the MAF server 106 (or, alternatively, the developer 104 herself) may upload the created application to an app store 110. Subsequently, at operation 112, an end-user 114 may download the application from the app store 110. (While a very common distribution method, uploading the application to an app store, is, of course, only one among several different ways of causing distribution of the application to one or more mobile devices. An alternative way is, for instance, to include the application with the software package installed on the devices as sold, or to sell it separately on a DVD or other computer-readable storage medium.) Later, when the application developer 104 wishes to make a change to a portion of the application, such as altering user interface elements or application functionality, the application developer 104 may change one or more configuration files and upload the altered configuration file(s) to a mobile platform server 118 at operation 116. At operation 120, the mobile platform server 118 may provision the new configuration file(s) to the end-user 114 (e.g., by sending a push-notification of the availability of an update to the mobile device 115, and then allowing the mobile device 115 to download the new configuration file(s), either automatically or upon download initiation by the user 114). Again, it will be evident that the altered configuration files can be distributed to the mobile device 115 in alternative ways, both electronically and via mechanical distribution of storage devices containing the configuration files.

The configuration files generally define part of the structure and elements of the application in a declarative manner (e.g., in extensible markup language (XML) format). They may be distributed from the mobile platform server 118 in bundled compressed form, hereinafter called an application configuration profile (ACP). The ACP may include various types of configuration files, which may be stored in separate folders within the ACP. So-called "tiles," which are generally expressed in XML, may define individual user interface elements and/or the layout of entire application screens or portions thereof. Tiles may be primitive or embed other tiles; by nesting tiles inside each other (in two or more levels), entire screens can be built up from smaller portions or elements. Other types of configuration files may specify and store styles, images, language-specific (i.e., localized) text strings, versioning information, and other metadata. To enable modifications to the behavior of an application, Java scripts may be integrated into the ACP, e.g., as files stored in a special scripts folder, which may have sub-folders for platform-independent and/or one or more platform-specific Javascript functions (or methods). The Javascripts may be invoked via an event-action mechanism (such that they run in response to certain events, just like other actions); for this purpose, special Javascript (JS) action may be incorporated into the layout XML descriptor that defines the structure of the user interface and the actions associated with user-control elements. The JS actions may specify one or more parameters, which, upon triggering of the JS action, are passed on to the corresponding Javascript function, along with an identifier of the triggering element (e.g., a user-interface control). In general, altering the configuration files associated with an application may involve adding new configuration files as well as, alternatively or additionally, altering already existing files. For example, in some embodiments, new Java script files are added to the ACP, and the already existing layout XML is modified to reference the corresponding JS actions. Changes to the application's behavior can be achieved with Java scripts that alter, via certain application programming interfaces exposed thereto, properties of various business objects and/or user-interface elements, as explained in detail below.

Figure 2:
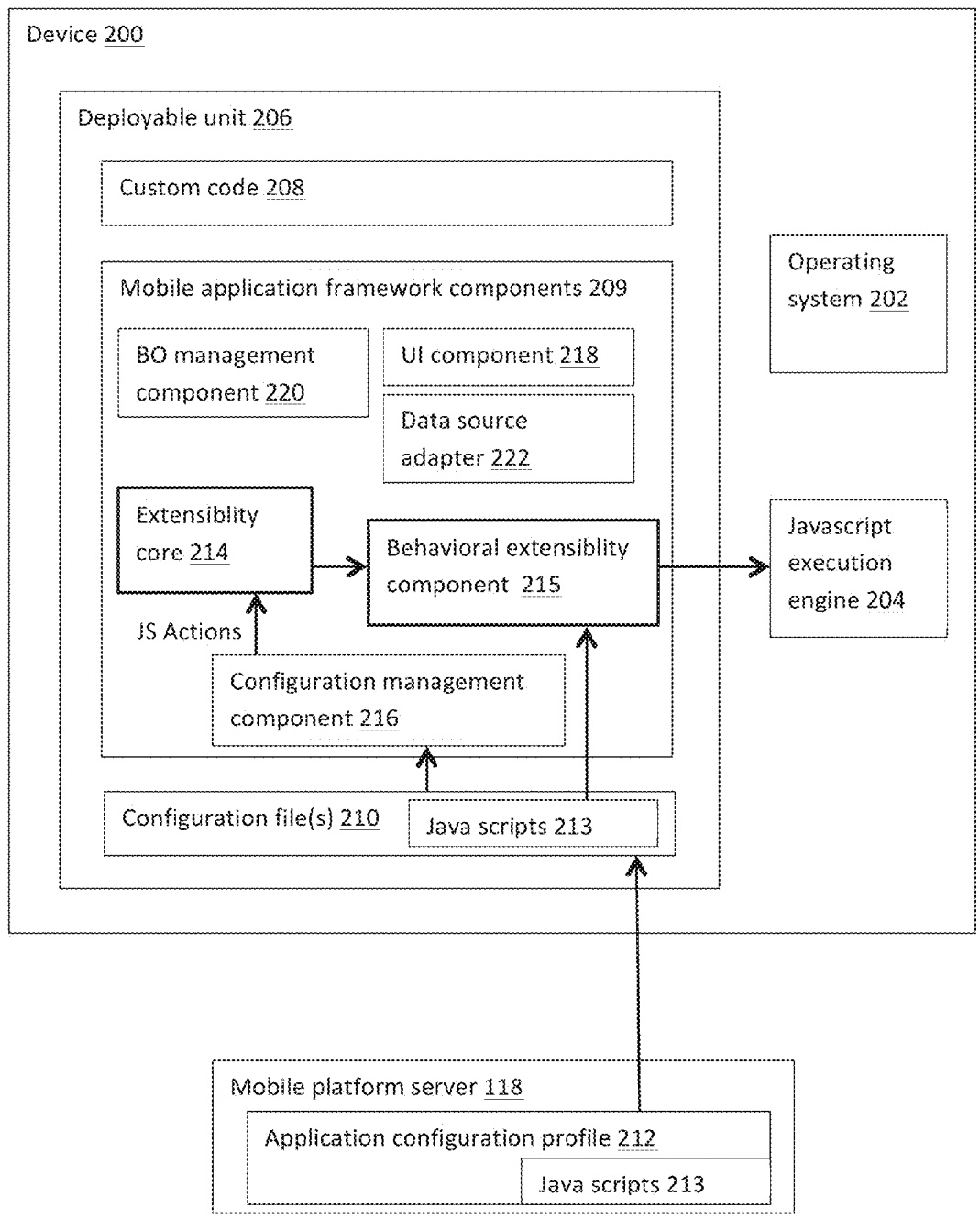
FIG. 2 is a block diagram illustrating an example system, including major software components, utilized in conjunction with extensible applications, in accordance with various embodiments.

FIG. 2 is a diagram illustrating major program modules utilized in accordance with an example embodiment. Stored on a mobile device (e.g., in volatile memory or permanent storage, or a combination thereof) may be, as shown, an operating system 202 (e.g., iOS™ or Android™), a Javascript execution engine 204, and a deployable unit 206 including the custom code 208, MAF components 209, and configuration files 210 associated with an application. When the deployable unit 206 is launched, it may initially simply execute as an ordinary application would, running various functions from the custom code 208. When a call to an MAF component 209 is encountered in the custom code 208, then control may pass to one or more functions defined within the MAF components 209, which, in turn, may retrieve metadata and/or scripts from the configuration files 210. The configuration files 210 can be updated or extended, at a time after the deployment of the deployable unit 206, by downloading an application configuration profile (ACP) 212, which may include Java scripts 213, from a mobile platform server 118.

The MAF components 209 may include an extensibility core 214, a behavioral extensibility component 215, a configuration management component 216, a user interface (UI) component 218, a business object (BO) management component 220, and a data source adapter (DSA) 222. The extensibility core 214 forms the central component of the MAF and instantiates and facilitates interactions between the other MAF components 209.

The configuration management component 216 reads and parses the metadata contained in the configuration files (such as user interface definitions, data bindings, user interface elements and controls, events, and built-in as well as custom actions). Further, it may transform metadata to native constructs using wrapper classes, dedicated parsers, and validators. In particular, the configuration management component 216 is responsible for extracting JS actions from the configuration file(s) 210 and passing them on to the extensibility core 214, which, upon triggering of a JS action (e.g., by the user), forwards it on to the behavioral extensibility component 215 for handling.

The behavioral extensibility component 215 is a separate library that is loaded at runtime by the extensibility core 214, provided it was linked with the application by the developer. (Note that, in the depicted modular approach, linking the behavioral extensibility component 215 against the application is optional. If the developer chooses not to include behavioral extensibility component, the application may still execute, but JS actions included in the configuration files will be ignored.) The extensibility component is responsible for retrieving, in response to a JS action, a Java script 213 including the corresponding Javascript function (which serves as the action handler) from the configuration files 210, validating it, and handing the validated script over to the Javascript execution engine 204 for execution. To allow a single ACP 212 to be consumed by multiple different versions of the MAF, the manner in which the scripts are obtained from the configuration file(s) 210 may be designed to integrate with the current versioning concept. For example, the Java scripts 213 may be organized in subfolders that are named in accordance with the version number of the MAF version number.

The Javascript execution engine 204 may be provided as part of the native software installed on the mobile device as sold, or may alternatively be installed separately by the user, or be provided as an additional component bundled with the deployable unit 206. In some embodiments, a Javascript Façade provides an intermediate layer between the extensibility core 214 and a native Javascript execution engine 204, as explained in more detail below.

The UI component 218 supports extensibility of the user interface by arranging the user interface based on the tile data (which provides structural extensibility) and/or the Javascript code (which provides behavioral extensibility). The UI component 218 may also include an MAF UI library on top of the native UI constructs that decorates and styles the various UI elements and controls, or, if such library is implemented as a separate component, the UI component 218 may act as a bridge between the application and MAF UI library. The UI component 218, or other components of the MAF, may include APIs that allow the application to access the native user interface. The BO management component 220 includes APIs that allow the custom code and/or the Java scripts 213 to access the business objects generated by and/or representing data handled by the application. The extensibility core 214 may define JS wrappers through which selected APIs of the UI and BO management components 218, 220 become available to the Java scripts 213 in the form of Javascript objects. The DSA 222 provides a public interface between data sources (e.g., third-party data sources available on the Internet, e.g., data sources compliant with the OData protocol) and the MAF and custom application code; by converting between specific data model objects and generic business objects, the DSA 222 allows both the framework and the application developer to operate and think in terms of generic business operations and the related create, read, update, and delete operations.

In various embodiments, the BO management component 220 is platform-independent, i.e., its APIs work regardless of the operating system employed. The UI component 218, by contrast, is typically platform-dependent, i.e., different APIs are used to access the functionality on different mobile platforms. To allow a developer to distribute his applications widely to many different types of devices, the UI component 218 may include APIs for multiple mobile operating systems, e.g., Android™ (from Google Inc.), iOS™ (from Apple Inc.), the Blackberry operating system, Windows® Phone (from Microsoft Inc.), and/or others. During execution of the application, the appropriate platform-specific API may then be invoked by the extensibility core or other libraries or components of the MAF. The extensibility functionality of the MAF may take the platform-independence of the BO management component 220 and the platform-dependence of the UI component 218 into account by allowing developers to separate out Java scripts 213 that use the BO APIs from those that use UI APIs, e.g., by placing them in separate files; this way, Java scripts 213 that access business objects can be re-used across platforms.

In various embodiments, the extensibility core 214 exposes only certain selected APIs of the UI and BO management components 218, 220 to the Java scripts 213; the non-selected APIs are not accessible to the developer for extensions. For example, with regard to the BO management component 220, in some embodiments, Java scripts 213 are allowed to read and write the attributes of existing objects, but prevented from creating and deleting business objects. In some embodiments, the Javascript layer operates exclusively on in-memory business objects (allowing even their creation), whereas model updates on the client or server (i.e., updates to the permanently stored database) are out of its reach. Similarly, with regard to the UI component 218, native UI elements may be exposed with certain restrictions, e.g., allowing access only to certain UI element properties (such as the background color of buttons, text of labels, visibility, etc.) while preventing developers from building user interfaces with the Java scripts 213; thus, APIs that expose the user interface beyond providing access to UI element properties are, in various embodiments, not exposed by the extensibility core 214. In some embodiments, existing UI elements within displayed tiles are accessible via their identifiers; thus, a UI API may query the displayed tile using the tile identifier and then one or more UI elements within the tile using their respective identifiers, and thereafter read and/or write the properties of the queried UI elements.

In general, some of the properties of UI elements may be of a simple type that can be readily transferred from and to Javascript in an easy form, while others may be of a complex type; examples of the latter include complex color types, shapes, or platform-specific constants. In various embodiments, suitable JS wrappers may be created by the extensibility core 214 to allow access to complex-type properties. Similarly, the BO APIs may support complex data types defined by the underlying DSA, and the extensibility core 214 may provide wrappers and JS objects to support use of such complex types via the Java scripts 213.

In various embodiments, the BO management component 220, via its APIs exposed to Java scripts 213, provides a cross-platform solution that enables application developers to simply access generic business objects with Java scripts 213, allowing the modification and inspection of fields within a business object, but disallowing modification operations on the entire business object itself. More specifically, developers may have access (i) to generic business-object values as objects using strings from Javascript, (ii) to DSA-specific types to work with from Javascript, and/or (iii) to a manager object that facilitates querying all or selected business objects of a given binding from the set of bindings available on the current tile. Business-object-level modification operations (create, update, delete) may be performed using already existing business-object actions found within the framework, which are not amenable to modification post-deployment of the application. These existing actions may be incorporated in the layout XML document, with corresponding action handlers defined in the custom code.

Figure 3A:
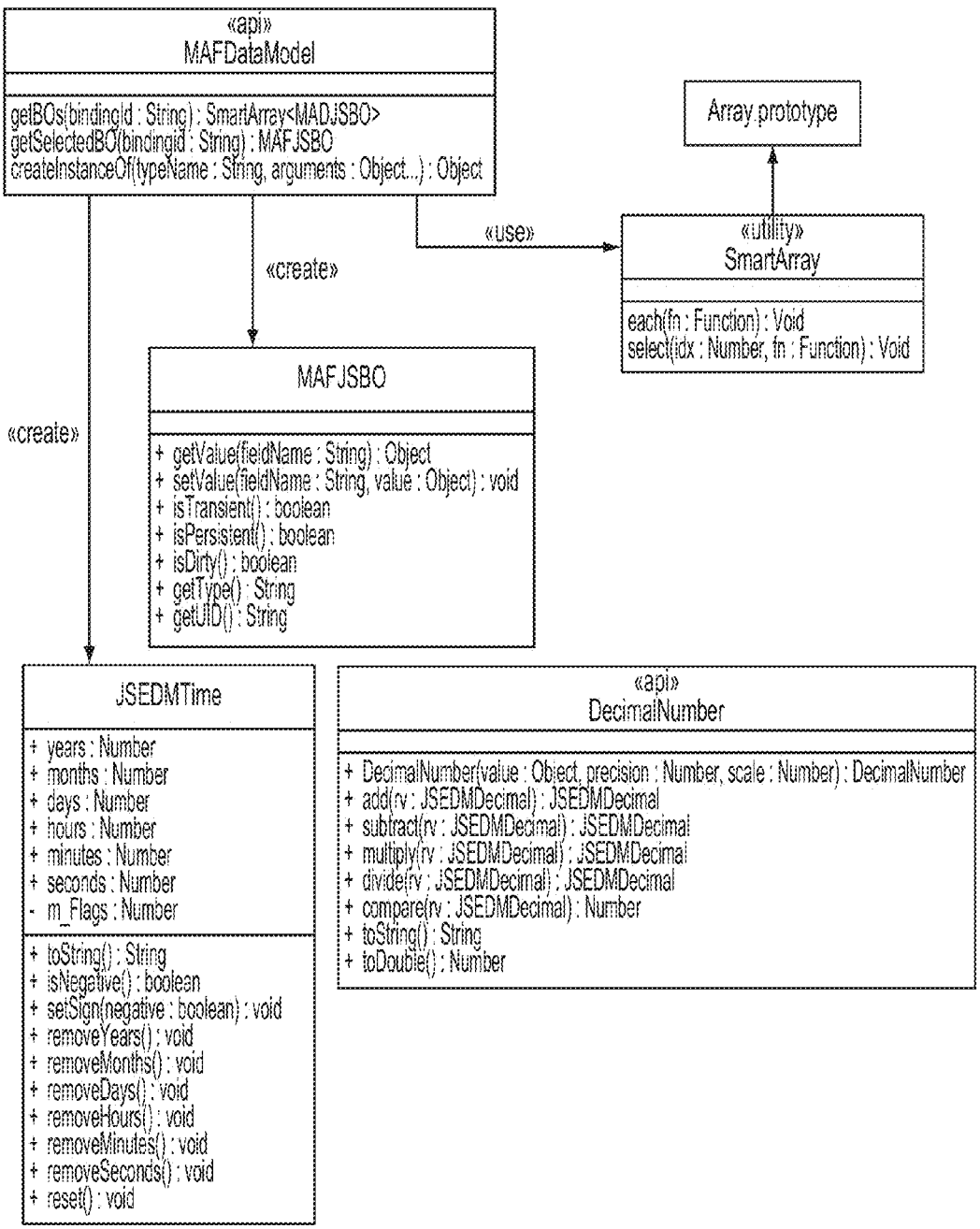
FIG. 3A depicts a Javascript-accessible business-object application programming interface in accordance with one embodiment.

FIG. 3A depicts the top-level parts constituting a Javascript-accessible BO API in accordance with one embodiment. The classes in this diagram are to be interpreted as Javascript objects, and specialization relations are to be interpreted as prototype inheritance. The following objects may be provided:

MAFDataModel—Marked with the "api" stereotype, meaning that it is available in the global Javascript context under this name, this is the entry point of the entire BO API. Its methods provide access to all BOs or only to the selected BO(s) (if any). Its "createInstanceOf( )" function can be used to instantiate DSA-specific types.

MAFJSBO—This is the Javascript manifestation of the native generic BO type.

DecimalNumber—This is a value type that can be mapped to platform-specific or even DSA-specific large number types (for example "java.math.BigDecimal" on Android, "NSDecimalNumber" on iOS). It is marked with the "api" stereotype, which allows script writers to instantiate it directly using the "new" operator.

JSEDMTime—This is the Javascript representation of the OData-specific "Edm.Time" data type. It is an example of a DSA-specific type that can be created using the "MAFDataModel.createInstanceOf( )" function.

SmartArray—This is a utility array which inherits from the built-in Javascript array type. It has an "each" function and a "select" function, which can be used to invoke the function specified as argument on all or on a selected element in the array.

A generic business object can store arbitrary objects in its fields. The DSA may map the platform-specific values taken from a field to the DSA-specific type. For example, the standard SDM adapter, which is communicating using OData, knows that fields of type "Date" (java.util.Date or NSDate, depending on platform) are converted to "Edm.DateTime." A similar mapping may exist between Javascript-specific types and native types, as illustrated in the table shown in FIG. 3B. Business-object wrappers generated by the DSA may take care of the conversion between these types. Types specific to a particular DSA implementation are rendered available in Javascript context via the "MAFDataModel.createInstanceOf( )" function, which calls out to the native-side function, which then asks the DSA to instantiate the type and wrap it properly for the Javascript context. This relieves the developer from having to define a custom JS wrapper for its custom types, as the MAF extensibility framework can perform the wrapping dynamically on its own. This effectively means that such types are not really mapped; they are simply wrapped and unwrapped as they enter and leave the Javascript context.

Access to the application user interface from Java scripts 213 is made possible by certain APIs of the UI component 218 (the JS UI API). In general, the JS UI API itself is, apart from a few top-level platform-independent constructs, heavily platform-dependent, as it exposes native UI controls and provides access to their properties for querying and modifying the graphical state. In various embodiments, the JS UI API (i) offers search methods to find certain UI elements within certain MAF tiles using their identifiers, (ii) allows direct read/write access to the properties of native UI elements directly (relieving the API from the burden of having to redefine and document UI elements), (iii) allows read-only access to parent and child UI elements, if possible, and (iv) allows access to limited type information about a given UI element. In embodiments, the UI API does not allow programmatic creation or modification of native user interfaces; rather, only certain properties of already existing UI elements can be altered by scripts.

Figure 4:
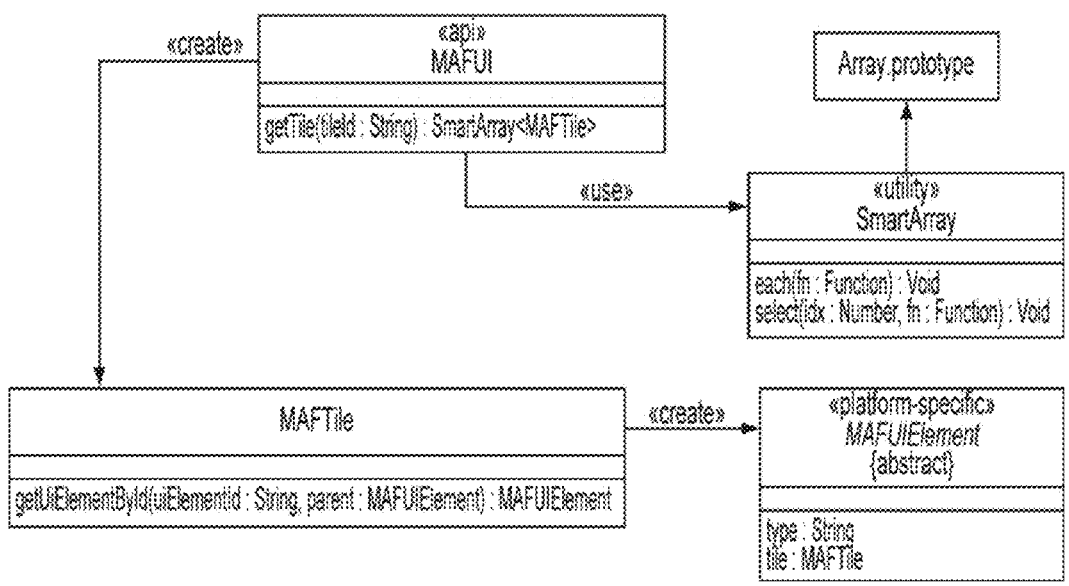
FIG. 4 depicts a Javascript-accessible user-interface application programming interface in accordance with one embodiment.

FIG. 4 depicts the top-level parts constituting the JS UI API. Again, the classes in this diagram are to be interpreted as Javascript objects, and specialization relations are to be interpreted as prototype inheritance. The following objects may be provided:

MAFUI—As its "api" stereotype suggests, this is the top-level object available in the Javascript global scope from which all UI JS API functionalities are accessible. It offers the "getTile( )" function that enables searches among the currently displayed tiles. Since a single identifier may be used by multiple tiles at the same time, this function returns a "SmartArray" containing "MAFTile" objects.

MAFTile—This object is the prototype of all MAF tiles and offers the "getUiElementById( )" function for finding UI elements. Its second parent argument is optional and can be used to filter the search for a given sub-tree.

MAFUIElement—This abstract object is the template of all UI elements that are exposed by the platform-specific parts of this API. That it is abstract means that no such object actually exists within the Javascript context; it is merely a description of the general look of UI element objects. Its stereotype indicates that it may contain more properties and functions than depicted in the figure, depending on platform-specific API specialties. At the minimum, every UI element object has a type property that indicates its native type (in a String form appropriate for the given platform) and a property pointing to its enclosing MAFTile object.

SmartArray—This is the same utility array as is used in the BO API.

The MAF components 209 may include a controller that controls the process flow of the application, including the order in which actions are executed. Actions include, for example, data updates based on user input, user interface refreshes in response to user input or changes to the data underlying the screen contents, navigation from one screen to the next, the loading of data, the creation or deletion of business objects, etc. In general, actions may be executed in multiple threads. For example, all actions related to the user interface may be executed in a main thread (or "UI thread"), whereas other actions (e.g., actions that manipulate data in the background without immediately affecting the user interface) may be executed in one or more background threads. In various embodiments, the execution of the Java scripts 213 is limited to a single thread, and the framework ensures that any Java script calls to methods on native wrappers are dispatched to the appropriate thread. This way, a single Javascript context is ensured, and data can be shared between Javascript functions without problems and without requiring additional orchestration.

Actions can generally be executed sequentially or in parallel (i.e., "asynchronously"). The execution mode may depend at least in part on the type of action; for example, in some embodiments, only actions related to business objects can be processed in parallel, whereas all other actions are executed sequentially in the UI thread. To avoid inconsistencies that can otherwise arise from the parallel execution of certain actions (i.e., the deletion of an object and, in parallel, the updating of a property of the same object), an example embodiment implements an action execution model that groups actions based on their interdependencies to avoid inconsistencies while allowing parallel execution where no risk of inconsistencies exists. In this execution model, an action group holds generally multiple actions (or action groups) and specifies whether these actions (or action groups) are to be executed in parallel or in sequence; action groups can be nested as needed to form more complex groupings, e.g., composites of actions and action groups. Actions or action groups that do not fall into any defined action group are executed sequentially by default. Note that the action group does not control whether the actions is fired asynchronously or not; this may still be decided based on the action type (e.g., actions related to business objects may be fired asynchronously, other known actions in the main UI thread, and custom actions in whichever manner the client code defines).

Figure 5:
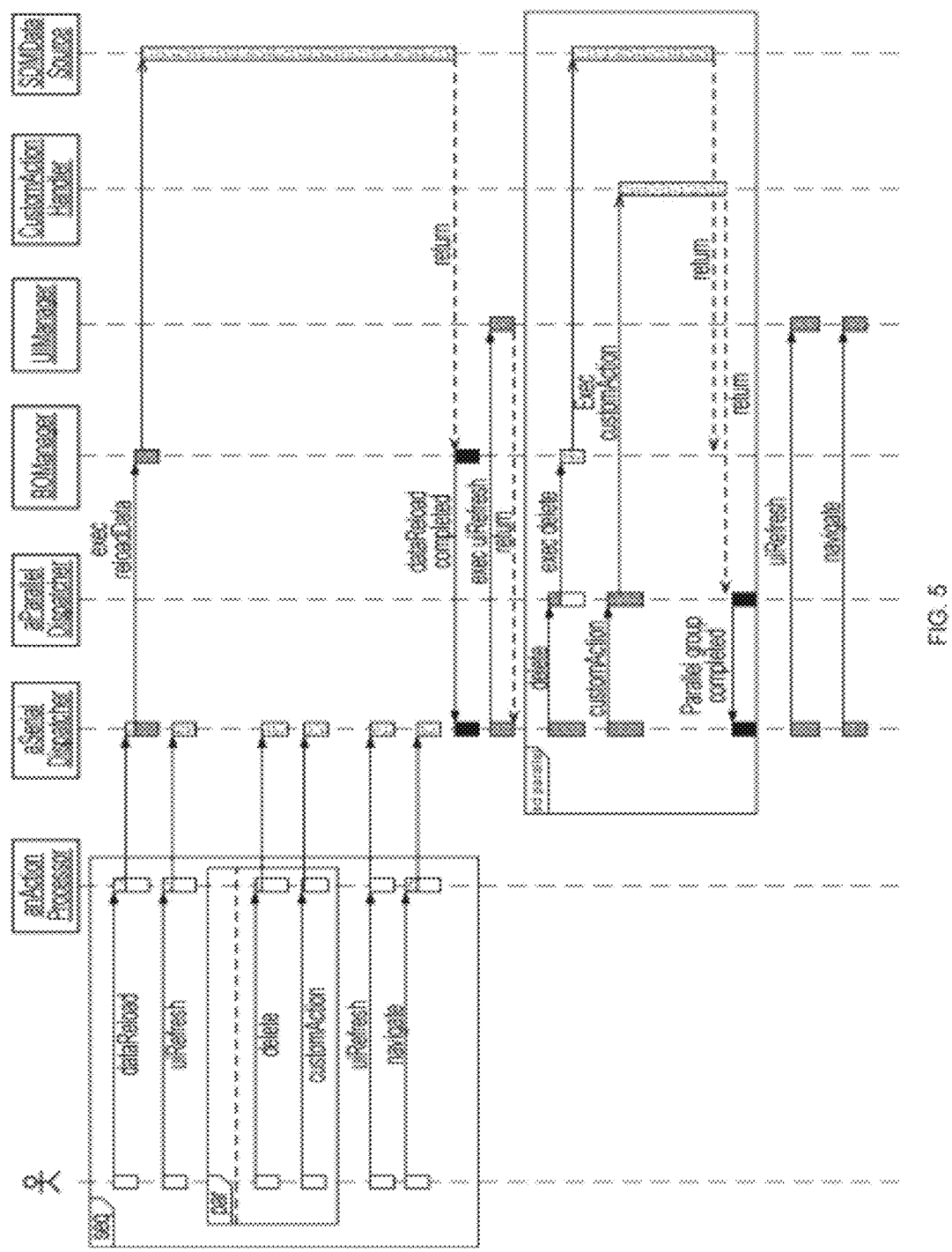
FIG. 5 is a sequence diagram illustrating an action execution model in accordance with one embodiment.

FIG. 5 illustrates action execution for the following example action-group configuration, which describes the actions taking place in response to a user clicking on a screen element:

```
<Event id="onClick">
    <ActionGroup type="serial">
        <Action actionID="dataReload"/>
        <Action actionID="uiRefresh" />
        <ActionGroup type="parallel" />
```

```
            <Action actionID="delete" />
            <Action actionID="customAction" />
        </ActionGroup>
        <Action actionID="uiRefresh" />
        <Action actionID="navigate" />
    </ActionGroup>
</Event>
```

As shown in FIG. 5, four classes are involved in handling the actions: an action processor receives all action to be executed in response to the click event, a serial dispatcher receives the actions contained with a serial action group, a parallel dispatcher receives the actions contained within a parallel action group, and a client-side-defined custom action handler is in charge of managing user-defined actions. The action processor queues all incoming action requests and forwards each to the applicable dispatcher. Since, in this example, the enclosing action group is a serial one, all actions, including the inner parallel action group, are passed to the serial dispatcher. The serial dispatcher starts the first "reloadData" action by invoking the BO management component (e.g., BO management component 220 of FIG. 2), which in turn executes the asynchronous data source request. The next action, "uiRefresh," is on hold until the asynchronous request completes. After "uiRefresh" has completed, the serial dispatcher starts the parallel action group (which contains the "delete" and the "customAction" actions). Since these are parallel actions, they are forwarded to the parallel dispatcher, which fires both actions at once. The next "uiRefresh" action is started only when both actions contained within the parallel action group have completed. Finally, the "navigate" action is processed, but not before "uiRefresh" finishes.

Figure 6:
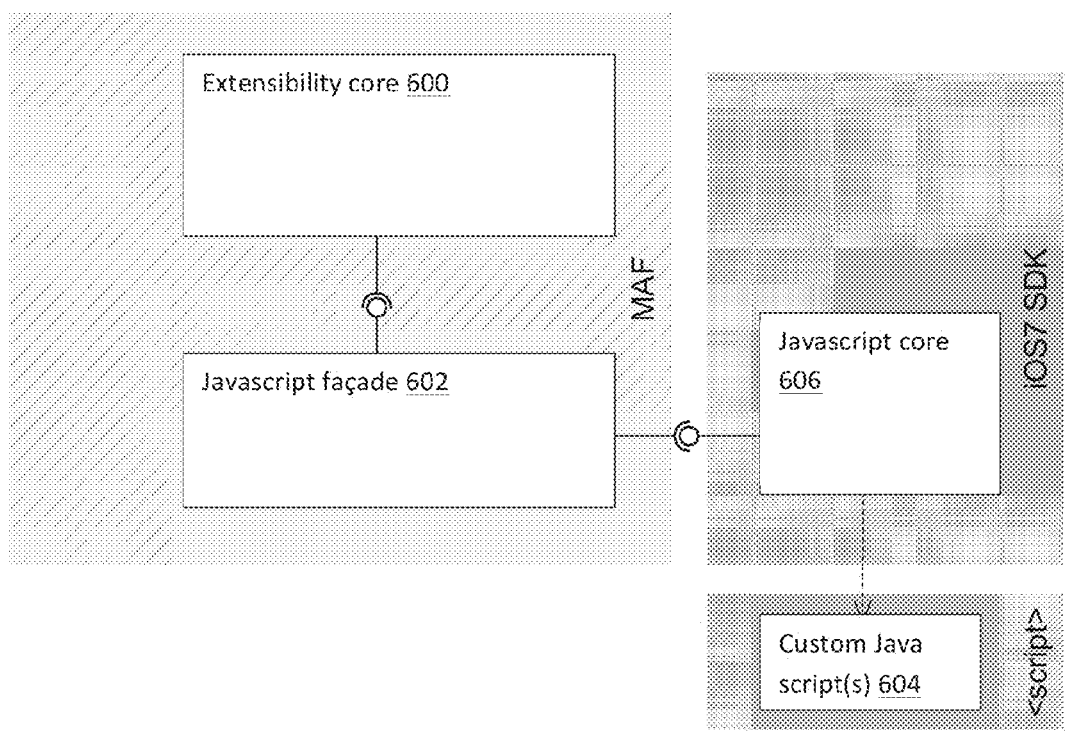
FIG. 6 is a block diagram illustrating an example software architecture for Java script execution in accordance with various embodiments.

In some embodiments, a Javascript façade acting on top of the Javascript engine is responsible for Javascript validation and execution; with this additional module, the extensibility library is decoupled from the Javascript core library (e.g., the Javascript engine) provided by the mobile platform. The Javascript façade is a static library which, in turn, uses the Javascript core library. Since the façade loads the Javascript core library by introspection, there is no build-time dependency between these two libraries. FIG. 6 illustrates an exemplary architecture for Java script execution. Herein, the extensibility core 600 is responsible for instantiating the Javascript façade 602, invoking the façade 602 to validate the Java scripts 604 from the ACP, and forwarding JS actions to the façade 602 for execution. The extensibility core 600 may also implement a single-threaded model for Java script execution, and ensure the consistency of action execution. The Javascript façade 602 is in charge of validating the Java scripts 604, performing any conversions between Javascript and native (e.g., Objective-C) data types, handling execution of the scripts 604 by the Javascript core 606, and handling errors encountered during such execution.

In some embodiments, when the extensibility core 600 encounters a JS action, it first checks whether a valid Javascript façade 602 object has been initialized. If so, the façade 602 attempts to execute the Javascript function, performs and error handling, and completes. The façade 602 can be uninitialized for two reasons: the current JS action may be the first one encountered, or a previous initialization attempt may have failed. Initialization failures may result from the unavailability of the Javascript core 606 library, errors found while evaluating the provided custom Java scripts 604, or other conditions, such as low memory availability. If no previous initialization attempt has been made, the extensibility core 600 may initialize the façade 602, which may then proceed to script validation and execution. If initialization has previously failed, the extensibility core 600 may either attempt initialization again (e.g., to determine whether a previous low-memory or other failure condition has disappeared) or log an error without further initialization attempts.

During Java script execution, errors can occur both in the script layer and in the native layer (e.g., the code accessed by the Java script). In some embodiments, all native errors are propagated to the Javascript layer, and issues which occur in the Javascript layer (unless handled locally) are sent to the Javascript façade 602. Application developers may be given a way to intercept and fix issues on the native side via error handler delegates. In general, error handling related to behavioral extension of applications is integrated with and/or follows the rules of error handling (including logging and tracing) as employed in the framework as a whole.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Applications

Figure 7:
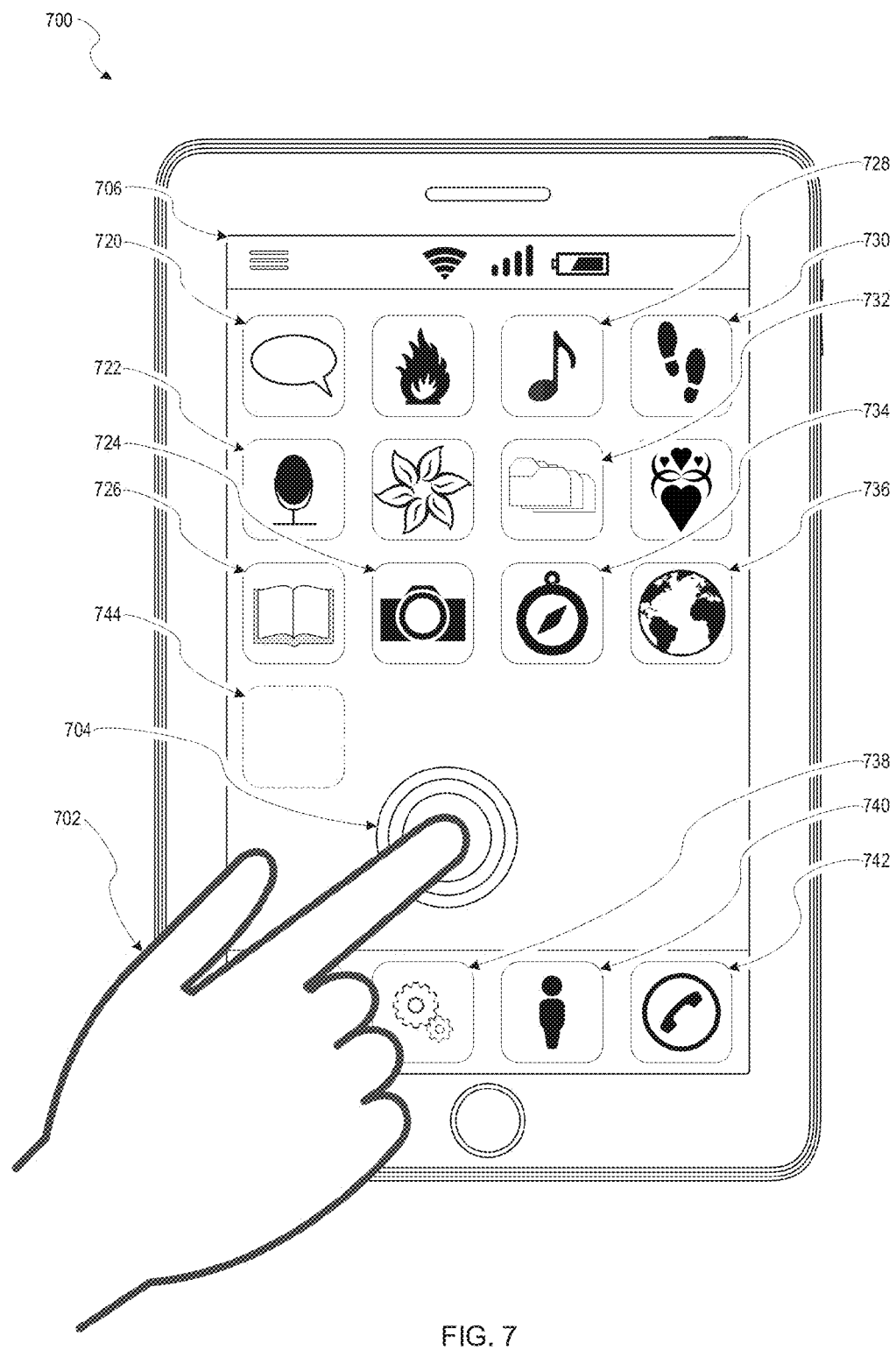
FIG. 7 depicts an example mobile device and mobile operating system user interface, according to example embodiments.

FIG. 7 illustrates an example mobile device 700 that may be running a mobile operating system (e.g., iOS™, Android™, Windows® Phone, or other mobile operating systems), according to example embodiments. In an example embodiment, the mobile device 700 may include a touch screen that may receive tactile information from a user 702. For instance, the user 702 may physically touch 704 the mobile device 700 and in response to the touch 704 the mobile device 700 may determine tactile information such as touch location, touch force, gesture motion, and so forth. In various example embodiment, the mobile device 700 may display a home screen 706 (e.g., Springboard on iOS™) that the user 702 of the mobile device 700 may use to launch applications and otherwise manage the mobile device 700. In various example embodiments, the home screen 706 may provide status information such as battery life, connectivity, or other hardware status. The home screen 706 may also include a plurality of icons that may be activated to launch applications, for example, by touching 704 the area occupied by the icon. Similarly, other user interface elements may be activated by touching an area occupied by a particular user interface element. In this manner, the user 702 may interact with the applications.

A broad spectrum of applications (also referred to as "apps") may be executing on the mobile device 700. The applications may include native applications (e.g., applications programmed in Objective-C running on iOS™ or applications programmed in Java running on Android™), mobile web applications (e.g., HTML5), and/or hybrid applications (e.g., a native shell application that launches an HTML5 session). In a specific example, the mobile device 700 may include a messaging app 720, audio recording app 722, a camera app 724, a book reader app 726, a media app 728, a browser app 730, a file management app 732, a direct app 734, a location app 736, a settings app 738, a contacts app 740, a telephone call app 742, other apps (e.g., gaming apps, social networking apps), and a third party app 744.

Software Architecture

Figure 8:
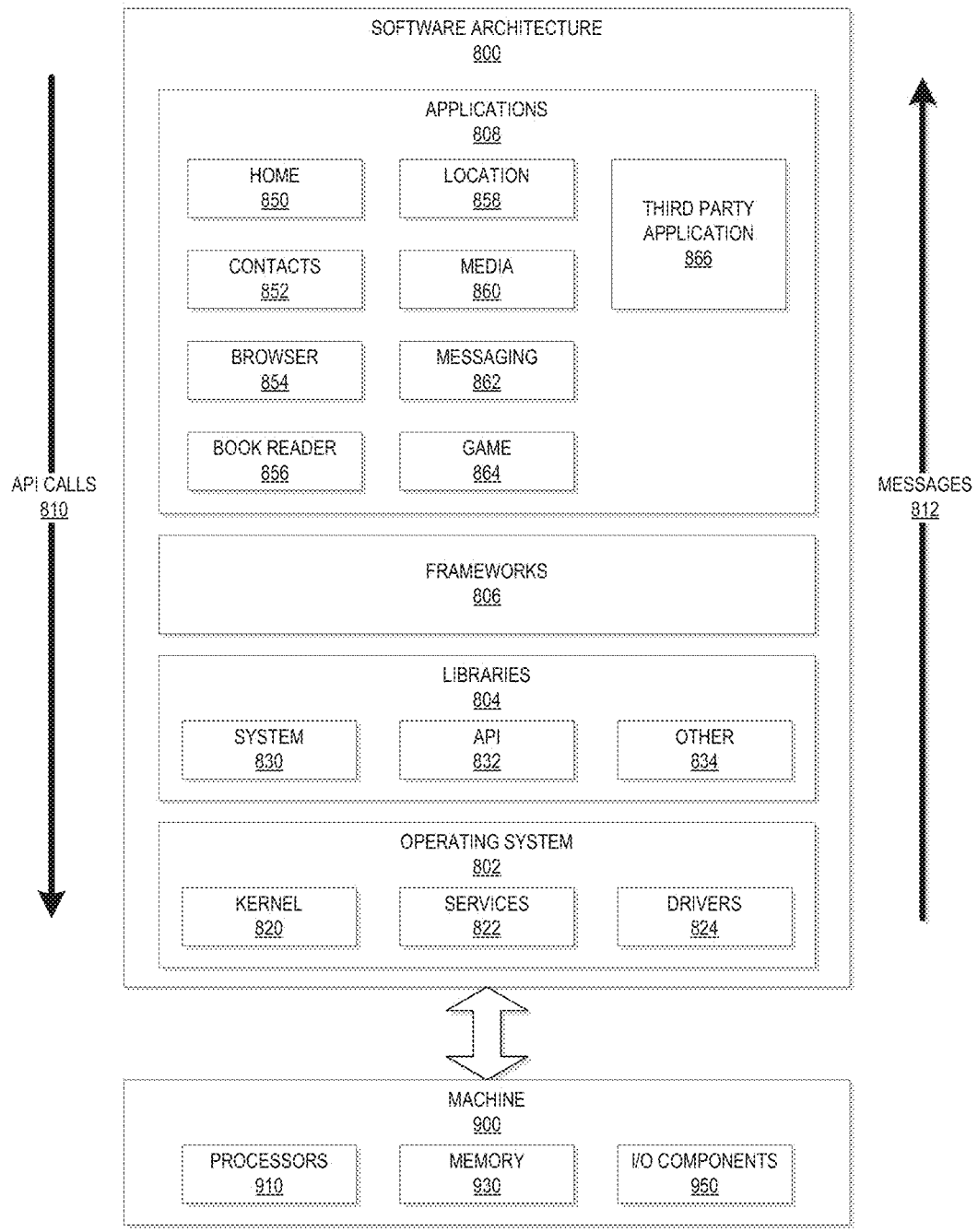
FIG. 8 is a block diagram illustrating an example of a software architecture that may be installed on a machine, according to example embodiments.

FIG. 8 is a block diagram illustrating an architecture of software 800, portions or the entirety of which may be installed on one or more of the devices depicted in FIG. 1 (e.g., mobile device 115 or mobile platform server 118). FIG. 8 is merely a non-limiting example of a software architecture and it will be appreciated that many other architectures may be implemented to facilitate the functionality described herein. The software 800 may be executing on hardware such as machine 900 of FIG. 9 that includes processors 910, memory 930, and I/O components 950. In the example architecture of FIG. 8, the software 800 may be conceptualized as a stack of layers where each layer may provide particular functionality. For example, the software 800 may include layers such as an operating system 802, libraries 804, frameworks 806, and applications 808. Operationally, the applications 808 may invoke application programming interface (API) calls 810 through the software stack and receive messages 812 in response to the API calls 810.

The operating system 802 may manage hardware resources and provide common services. The operating system 802 may include, for example, a kernel 820, services 822, and drivers 824. The kernel 820 may act as an abstraction layer between the hardware and the other software layers. For example, the kernel 820 may be responsible for memory management, processor management (e.g., scheduling), component management, networking, security settings, and so on. The services 822 may provide other common services for the other software layers. The drivers 824 may be responsible for controlling and/or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 804 may provide a low-level common infrastructure that may be utilized by the applications 808. The libraries 804 may include system libraries 830 (e.g., C standard library) that may provide functions such as memory allocation functions, string manipulation functions, mathematic functions, and the like. In addition, the libraries 804 may include API libraries 832 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 804 may also include a wide variety of other libraries 834 to provide many other APIs to the applications 808.

The frameworks 806 may provide a high-level common infrastructure that may be utilized by the applications 808. For example, the frameworks 806 may provide various graphic user interface (GUI) functions, high-level resource management, high-level location services, and so forth. The frameworks 806 may provide a broad spectrum of other APIs that may be utilized by the applications 808, some of which may be specific to a particular operating system or platform.

The applications 808 include a home application 850, a contacts application 852, a browser application 854, a book reader application 856, a location application 858, a media application 860, a messaging application 862, a game application 864, and a broad assortment of other applications such as third-party application 866. In a specific example, the third-party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 866 may invoke the API calls 810 provided by the mobile operating system 802 to facilitate functionality described herein.

Example Machine Architecture and Machine-Readable Medium

Figure 9:
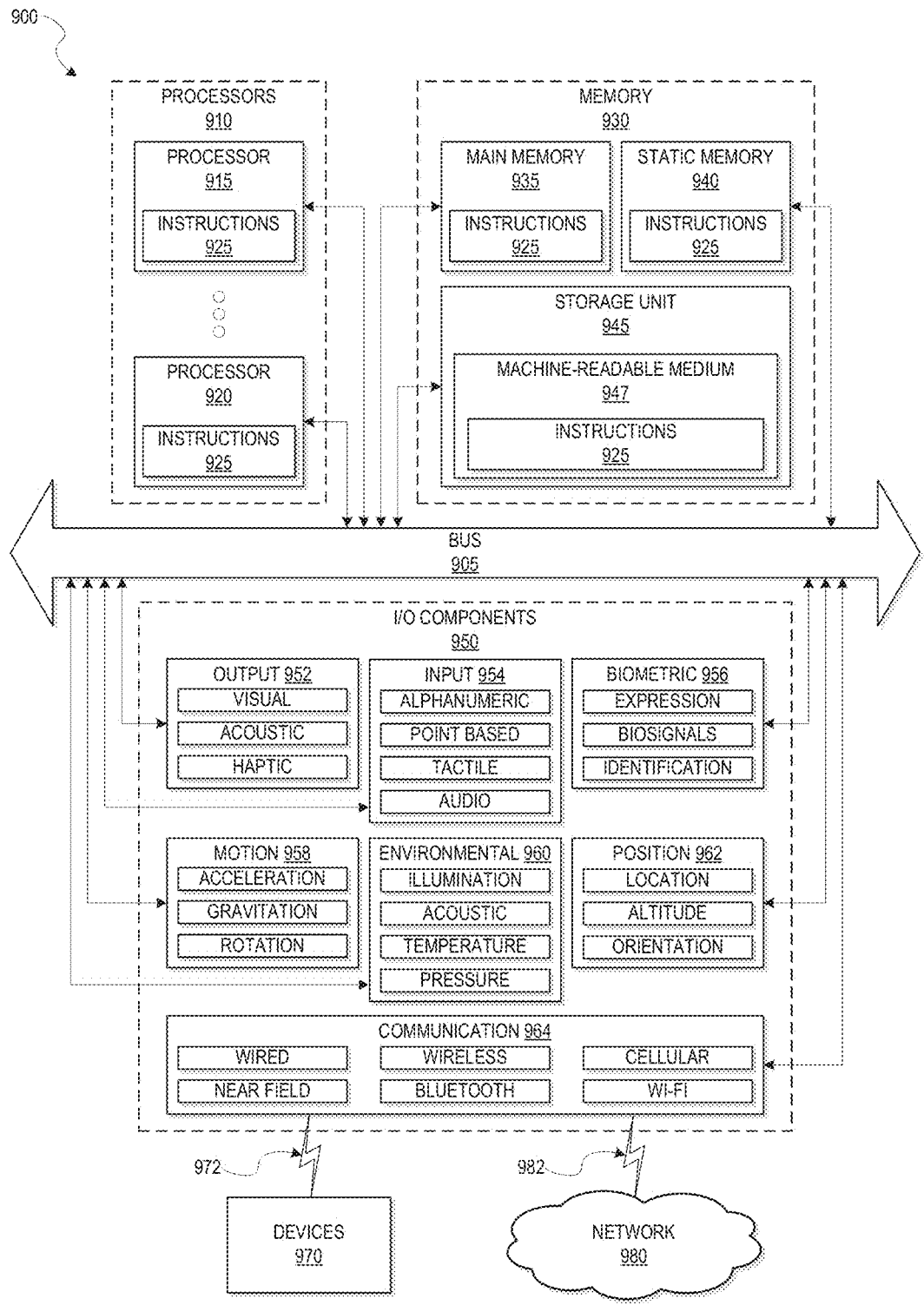
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 925 (e.g., software, a program, an application, an applet, an app, or other executable code) for causing the machine 900 to perform any one or more of the methodologies discussed herein may be executed. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but be not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 925, sequentially or otherwise, that specify actions to be taken by machine 900. Further, while only a single machine 900 is illustrated, the term "machine" shall also be taken to include a collection of machines 900 that individually or jointly execute the instructions 925 to perform any one or more of the methodologies discussed herein.

The machine 900 may include processors 910, memory 930, and I/O components 950, which may be configured to communicate with each other via a bus 905. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 915 and processor 920 that may execute instructions 925. The term "processor" is intended to include multi-core processor that may comprise two or more independent processors (also referred to as "cores") that may execute instructions contemporaneously. Although FIG. 9 shows multiple processors 910, the machine 900 may include a single processor with a single core, a single processor with multiple cores (e.g., a multi-core process), multiple processors with a single core, multiple processors with multiples cores, or any combination thereof.

The memory 930 may include a main memory 935, a static memory 940, and a storage unit 945 accessible to the processors 910 via the bus 905. The storage unit 945 may include a machine-readable medium 947 on which are stored the instructions 925 embodying any one or more of the methodologies or functions described herein. The instructions 925 may also reside, completely or at least partially, within the main memory 935, within the static memory 940, within at least one of the processors 910 (e.g., within a processor's cache memory), or any suitable combination thereof, during execution thereof by the machine 900. Accordingly, the main memory 935, static memory 940, and the processors 910 may be considered as machine-readable media 947.

As used herein, the term "memory" refers to a machine-readable medium 947 able to store data temporarily or permanently and may be taken to include, but not be limited to, random-access memory (RAM), read-only memory (ROM), buffer memory, flash memory, and cache memory. While the machine-readable medium 947 is shown in an example embodiment to be a single medium, the term "machine-readable medium" should be taken to include a single medium or multiple media (e.g., a centralized or distributed database, or associated caches and servers) able to store instructions 925. The term "machine-readable medium" shall also be taken to include any medium, or combination of multiple media, that is capable of storing instructions (e.g., instructions 925) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 may include a wide variety of components to receive input, provide and/or produce output, transmit information, exchange information, capture measurements, and so on. It will be appreciated that the I/O components 950 may include many other components that are not shown in FIG. 9. In various example embodiments, the I/O components 950 may include output components 952 and/or input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or other pointing instrument), tactile input components (e.g., a physical button, a touch screen that provides location and force of touches or touch gestures, and/or other tactile input components), audio input components (e.g., a microphone), and the like.

In further example embodiments, the I/O components 950 may include biometric components 956, motion components 958, environmental components 960, and/or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e g, infrared sensors that detect nearby objects), and/or other components that may provide indications, measurements, and/or signals corresponding to a surrounding physical environment. The position components 962 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 and/or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine and/or any of a wide variety of peripheral devices (e.g., a peripheral device couple via a Universal Serial Bus (USB)).

Moreover, the communication components 964 may detect identifiers and/or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), acoustic detection components (e.g., microphones to identify tagged audio signals), and so on. In additional, a variety of information may be derived via the communication components 964, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3 G, fourth generation wireless (4 G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 925 may be transmitted and/or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 925 may be transmitted and/or received using a transmission medium via the coupling 972 (e.g., a peer-to-peer coupling) to devices 970. The term "transmission medium" shall be taken to include any intangible medium that is capable of storing, encoding, or carrying instructions 925 for execution by the machine 900, and includes digital or analog communications signals or other intangible media to facilitate communication of such software.

Furthermore, the machine-readable medium 947 is non-transitory (in other words, not having any transitory signals) in that it does not embody a propagating signal. However, labeling the machine-readable medium 947 as "non-transitory" should not be construed to mean that the medium is incapable of movement; the medium should be considered as being transportable from one physical location to another.

Additionally, since the machine-readable medium 947 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A method of creating an extensible application, the method comprising:
    on a computer, defining code and one or more configuration files for the extensible application, the code and the one or more configuration files collectively defining a behavior of the extensible application, the code including calls to one or more of a plurality of generic components of a mobile application framework;
    using the computer, combining the code and the one or more configuration files with the plurality of generic components of the mobile application framework into a deployable unit, the generic components collectively being configured to, when executed by a processor, extract Java scripts from the one or more configuration files and cause their execution by a Javascript execution engine;
    causing the deployable unit to be distributed from the computer to one or more devices;
    altering the one or more configuration files, the altered one or more configuration files comprising at least one Java script configured to alter a behavior of the extensible application; and
    causing the altered one or more configuration files to be distributed to the one or more devices separately from the deployable unit.

2. The method of claim 1, wherein causing the deployable unit to be distributed to one or more devices comprises uploading the deployable unit to an app store for downloading therefrom to the one or more devices.

3. The method of claim 1, wherein causing the altered one or more configuration files to be distributed comprises uploading the altered one or more configuration files to a server for distribution therefrom to the one or more mobile devices.

4. The method of claim 1, wherein the combining into the deployable unit comprises compiling the code and the plurality of generic components, and wherein distribution of the altered one or more configuration files to the one or more devices causes the behavior of the application to be altered without recompilation.

5. The method of claim 1, wherein altering the one or more configuration files comprises adding the at least one Java script to the one or more configuration files and including, for each of the at least one added Java script, an associated Javascript action into a layout XML file.

6. The method of claim 1, wherein altering the one or more configuration files comprises configuring the at least one Java script to alter a property of a business object.

7. The method of claim 1, wherein altering the one or more configuration files comprises configuring the at least one Java script to alter a property of a UI element.

8. A system for creating an extensible application, comprising:
    a mobile application framework (MAF) server configured to
        receive, from an application developer, code and one or more configuration files associated with a mobile application,
        combine the code and the one or more configuration files with a plurality of MAF components stored on a machine-readable storage medium of the MAF server into a compiled deployable unit, and
        distribute the compiled deployable unit to one or more mobile devices; and
    a mobile platform server configured to receive one or more altered configuration files associated with the mobile application from the application developer and distribute the one or more altered configuration files to the one or more mobile devices,
    wherein the MAF components are collectively configured to, when executed by a processor, extract Java scripts from the one or more configuration files and cause their execution by a Javascript execution engine, whereby a behavior of the mobile application on the one or more mobile devices is alterable by the application developer, without recompilation and redistribution of the code, by provision, to the one or more mobile devices via the mobile platform server, of an altered configuration file comprising a Java script.

9. A mobile device comprising: a processor; and a machine-readable storage medium storing instructions, executable by the processor, comprising:

code and one or more configuration files associated with and collectively defining a behavior of a mobile application, the code including calls to one or more of a plurality of components of a mobile application framework (MAF), and the plurality of components of the MAF, comprising an extensibility core, a configuration management component, and a behavioral extensibility component, the configuration management component being configured to extract Javascript actions from the one or more configuration files and pass the extracted Javascript actions to the extensibility core;

the extensibility core being configured to, in response to triggering of one of the extracted Javascript actions by a user, pass the triggered Javascript action to the behavioral extensibility component;

and the behavioral extensibility component being configured to retrieve, in response to receipt of one of the Javascript actions from the extensibility core, a Java script associated therewith from the configuration files and cause execution of the retrieved Java script by a Javascript execution engine, whereby a behavior of the mobile application on the one or more mobile devices is alterable by the application developer, without recompilation and redistribution of the code.

10. The device of claim 9, wherein the one or more configuration files comprise at least one configuration file first stored on the mobile device at a time after initial storage thereon of the code and the components of the MAF.

11. The device of claim 9, wherein the components of the MAF further comprise a business-object (BO) management component comprising one or more APIs for manipulating business objects, and wherein the extensibility core is configured to expose at least one API of the BO management component.

12. The device of claim 11, wherein the extensibility core is configured to expose only one or more APIs of the BO management component that only provide read and write access to properties of existing business objects, but do not allow business objects to be created or deleted.

13. The device of claim 9, wherein the components of the MAF further comprise a user-interface (UI) component comprising one or more APIs for manipulating user interface elements, and wherein the extensibility core is configured to expose at least one API of the UI component.

14. The device of claim 13, wherein the extensibility core is configured to expose only one or more APIs of the UI component that only provide read and write access to properties of existing user-interface elements, but do not allow user-interface elements to be created or deleted.

15. The device of claim 9, wherein the components of the MAF are configured to limit Java script execution to a single thread.

16. The device of claim 9, wherein the behavioral extensibility component is configured to further validate the retrieved Java scripts.

17. The device of claim 9, wherein the behavioral extensibility component comprises a Javascript façade communicatively coupling the extensibility core to the Javascript execution engine and configured to validate Java scripts received from the extensibility core.

* * * * *